United States Patent
Zou et al.

(10) Patent No.: US 9,961,652 B2
(45) Date of Patent: May 1, 2018

(54) POWER CONTROL METHOD AND APPARATUS

(71) Applicant: HUAWEI TECHNOLOGIES CO., LTD., Shenzhen (CN)

(72) Inventors: Zhiqiang Zou, Shanghai (CN); Honglin Chai, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days. days.

(21) Appl. No.: 15/264,163

(22) Filed: Sep. 13, 2016

(65) Prior Publication Data

US 2016/0381650 A1 Dec. 29, 2016

Related U.S. Application Data

(63) Continuation of application No. PCT/CN2015/073478, filed on Mar. 2, 2015.

(30) Foreign Application Priority Data

Mar. 14, 2014 (CN) .......................... 2014 1 0097526

(51) Int. Cl.
  *H04M 1/00* (2006.01)
  *H04W 52/52* (2009.01)
  (Continued)

(52) U.S. Cl.
  CPC ............ *H04W 52/52* (2013.01); *H04L 7/007* (2013.01); *H04L 43/028* (2013.01);
  (Continued)

(58) Field of Classification Search
  CPC .. H04B 1/0475; H04B 37/0227; H04W 52/20
  (Continued)

(56) References Cited

U.S. PATENT DOCUMENTS

| 6,907,259 B1* | 6/2005 | Nilsson ................. H04W 52/20 455/441 |
| 2008/0207143 A1* | 8/2008 | Skarby ................. H04B 1/0475 455/103 |
| 2012/0112654 A1* | 5/2012 | Choong ............. H05B 37/0227 315/291 |

(Continued)

FOREIGN PATENT DOCUMENTS

| CN | 101242664 A | 8/2008 |
| CN | 102546498 A | 7/2012 |

(Continued)

OTHER PUBLICATIONS

Extended European Search Report dated Jan. 12, 2017 in Patent Application No. 15761004.9.
International Search Report dated May 29, 2015 in PCT/CN2015/073478 (with English Translation of Category of Cited Documents).
(Continued)

*Primary Examiner* — Ajibola Akinyemi
(74) *Attorney, Agent, or Firm* — Oblon, McClelland, Maier & Neustadt, L.L.P.

(57) ABSTRACT

The present disclosure relates to a power control method and apparatus, where the method includes: respectively determining, by a base station, error vector magnitude EVM indicator adjustment parameters of n terminals according to terminal types of the n terminals that are currently scheduled; processing, according to the EVM indicator adjustment parameters of the n terminals, to-be-transmitted signals of the n terminals to obtain an output signal, and determining a change of total power of the output signal relative to the to-be-transmitted signals; and dynamically controlling a supply voltage of a power amplifier according to the change of the total power of the output signal relative to the to-be-transmitted signals. According to the power control method and apparatus provided in embodiments of the present disclosure, different processing is performed on signals of different terminals, so that system performance of the OFDM system is improved.

17 Claims, 4 Drawing Sheets

(51) Int. Cl.

| | |
|---|---|
| *H04W 52/34* | (2009.01) |
| *H04L 7/00* | (2006.01) |
| *H04L 12/26* | (2006.01) |
| *H04W 24/02* | (2009.01) |
| *H04W 52/02* | (2009.01) |
| *H04L 27/26* | (2006.01) |
| *H04W 88/12* | (2009.01) |

(52) U.S. Cl.
CPC ....... *H04W 24/02* (2013.01); *H04W 52/0209* (2013.01); *H04W 52/346* (2013.01); *H04L 27/2601* (2013.01); *H04W 88/12* (2013.01); *Y02B 60/50* (2013.01)

(58) Field of Classification Search
USPC ...................................................... 455/574
See application file for complete search history.

(56) References Cited

U.S. PATENT DOCUMENTS

2013/0279629 A1 10/2013 Seller
2014/0016723 A1 1/2014 Mu et al.

FOREIGN PATENT DOCUMENTS

| EP | 2 237 626 A1 | 10/2010 |
| GB | 2 455 066 A | 6/2009 |

OTHER PUBLICATIONS

International Search Report dated May 29, 2015 in WIPO Application No. PCT/CN2015/073478.

\* cited by examiner

POWER CONTROL METHOD AND APPARATUS

CROSS-REFERENCE TO RELATED APPLICATIONS

This application is a continuation of International Application No. PCT/CN2015/073478, filed on Mar. 2, 2015, which claims priority to Chinese Patent Application No. 201410097526.6, filed on Mar. 14, 2014, both of which are hereby incorporated by reference in their entireties.

TECHNICAL FIELD

The present disclosure relates to the field of communications technologies, and in particular, to a power control method and apparatus.

BACKGROUND

An orthogonal frequency division multiplexing (OFDM) technology currently is a widely used technology, and a technology used by the current hottest communications standard Long Term Evolution (LTE) is the OFDM technology, where in the OFDM technology, a channel is divided into several orthogonal sub-channels, and data is modulated onto each sub-channel for transmission. Orthogonal signals may be separated at a receive end by using a related technology, which may reduce mutual interference among sub-channels, and also make it easier to receive the signals.

The OFDM technology has many advantages, for example, a strong anti-attenuation capability and high frequency utilization. However, an OFDM signal is obtained by adding together multiple subcarrier signals that are independent and modulated, and such a composite signal may generate relatively high peak power, that is, a peak to average power ratio (PAPR) is extremely high, which causes reduction in power amplifier efficiency. To improve performance of an OFDM system, a base station generally needs to process a signal by using a power control method, such as PAPR reduction and control of error vector magnitude (EVM).

However, in an existing power control method, same processing is performed on signals at an entire frequency band. The entire frequency band may include modulated signals of different orders (that is, signals of different users), and the modulated signals of different orders have different requirements for modulation precision. In an existing power control and processing method, different processing cannot be performed on different signals of different orders to meet different demands. Signals of high order (that is, a near-end user) generally has poorer precision, and users at different distances cannot be simultaneously considered; therefore, overall performance of the OFDM system is limited.

SUMMARY

The present disclosure provides a power control method and apparatus, by which different processing is performed on signals of different terminals, so that a balance among total power, EVM, and power amplifier efficiency in an OFDM system is considered, and system performance of the OFDM system is improved.

According to a first aspect, the present disclosure provides a power control method, where the power control method includes:

respectively determining, by a base station, error vector magnitude EVM indicator adjustment parameters of n terminals according to terminal types of the n terminals that are currently scheduled, where n is a positive integer, the EVM indicator adjustment parameter includes at least one of the following: a power control parameter or a peak to average power ratio PAPR reduction parameter, and the terminal type includes: a near-end user, a mid-range user, or a far-end user;

processing, by the base station according to the EVM indicator adjustment parameters of the n terminals, to-be-transmitted signals of the n terminals to obtain an output signal, and determining a change of total power of the output signal relative to the to-be-transmitted signals; and dynamically controlling, by the base station, a supply voltage of a power amplifier according to the change of the total power of the output signal relative to the to-be-transmitted signals.

With reference to the first aspect, in a first possible implementation manner of the first aspect, the dynamically controlling, by the base station, a supply voltage of a power amplifier according to the change of the total power of the output signal relative to the to-be-transmitted signals includes: if the total power of the output signal relative to the to-be-transmitted signals becomes higher, increasing the supply voltage of the power amplifier; or if the total power of the output signal relative to the to-be-transmitted signals becomes lower, decreasing the supply voltage of the power amplifier.

With reference to the first possible implementation manner of the first aspect, in a second possible implementation manner of the first aspect, the determining, by a base station, error vector magnitude EVM indicator adjustment parameters of n terminals according to types of the n terminals that are currently scheduled specifically includes:

adjusting, by the base station, the power control parameter to decrease power of a terminal whose terminal type is a near-end user; or adjusting, by the base station, the power control parameter to increase power of a terminal whose terminal type is a mid-range user or a far-end user.

With reference to the first or the second possible implementation manner of the first aspect, in a third possible implementation manner of the first aspect, the processing, by the base station according to the EVM indicator adjustment parameters, to-be-transmitted signals to obtain an output signal is specifically:

adjusting, by the base station according to the power control parameters, first parameter values in the to-be-transmitted signals to obtain the output signal, where the first parameter value is used to indicate a power adjustment value of a carrier, and therefore transmit power of the n terminals is controlled.

With reference to the first or the second possible implementation manner of the first aspect, in a fourth possible implementation manner of the first aspect, the processing, by the base station according to the EVM indicator adjustment parameters, to-be-transmitted signals to obtain an output signal is specifically:

using, by the base station, the to-be-transmitted signals as an input signal for PAPR reduction processing; and performing, by the base station according to the power control parameters, frequency-division PAPR reduction processing on the input signal for PAPR reduction processing, so as to obtain the output signal.

With reference to the fourth possible implementation manner of the first aspect, in a fifth possible implementation manner of the first aspect, the PAPR reduction parameters include at least frequencies $F_i$ ($i=1, 2, \ldots, n$) used by the n terminals, bandwidths $B_i$ ($i=1, 2, \ldots, n$) used by the n terminals, and parameters $C_i$ ($i=1, 2, \ldots, n$); and the performing, by the base station according to the PAPR reduction parameters, frequency-division PAPR reduction processing on the input signal for PAPR reduction processing, so as to obtain the output signal specifically includes:

S1. Perform, according to a preset threshold T, peak clipping processing on the input signal for PAPR reduction processing to obtain a peak-clipped signal.

S2. Perform filtering processing on the peak-clipped signal by separately using n+1 filters $f_i$ ($i=0, 1, 2, \ldots, n$) to obtain n+1 filtered signals, where a filter $f_i$ ($i=1, 2, \ldots, n$) is generated according to a frequency $F_i$ used by an ith terminal and a bandwidth $B_i$ used by the ith terminal.

S3. Respectively multiply the n+1 filtered signals by parameters $C_i$ ($i=0, 1, 2, \ldots, n$) to obtain n+1 adjusted signals.

S4. Add the n+1 adjusted signals to the input signal for PAPR reduction processing to obtain a PAPR reduction processed signal.

S5. Use the PAPR reduction processed signal as the output signal; or use the PAPR reduction processed signal as an input signal for next-round PAPR reduction processing, repeatedly perform S1 to S4 until amplitude of the PAPR reduction processed signal is smaller than the preset threshold T or a quantity of performing times reaches a preset quantity of performing times, and then use the PAPR reduction processed signal as the output signal.

According to a second aspect, the present disclosure further provides a power control apparatus, where the power control apparatus includes: an upper-layer control module, a processing module, and a power amplifier control module, where the upper-layer control module is configured to respectively determine error vector magnitude EVM indicator adjustment parameters of n terminals according to terminal types of the n terminals that are currently scheduled, where n is a positive integer, the EVM indicator adjustment parameter includes at least one of the following: a power control parameter or a peak to average power ratio PAPR reduction parameter, and the terminal type includes: a near-end user, a mid-range user, or a far-end user;

the processing module is configured to process, according to the EVM indicator adjustment parameters that are configured by the upper-layer control module and that are of the n terminals, to-be-transmitted signals of the n terminals to obtain an output signal; and the power amplifier control module is configured to determine a change of total power of the output signal that are obtained by means of processing by the processing module and that are relative to the to-be-transmitted signals, and dynamically control a supply voltage of a power amplifier according to the change of the total power of the output signal relative to the to-be-transmitted signals.

With reference to the second aspect, in a first possible implementation manner of the second aspect, the power amplifier control module is specifically configured to: if the total power of the output signal relative to the to-be-transmitted signals becomes higher, increase the supply voltage of the power amplifier; or if the total power of the output signal relative to the to-be-transmitted signals becomes lower, decrease the supply voltage of the power amplifier.

With reference to the first possible implementation manner of the second aspect, in a second possible implementation manner of the second aspect, the upper-layer control module is specifically configured to: adjust the power control parameter to decrease power of a terminal whose terminal type is a near-end user; or adjust the power control parameter to increase power of a terminal whose terminal type is a mid-range user or a far-end user.

With reference to the first or the second possible implementation manner of the second aspect, in a third possible implementation manner of the second aspect, the processing module includes:

a user power configuration module, configured to adjust, according to the power control parameters, first parameter values in the to-be-transmitted signals to obtain the output signal, where the first parameter value is used to indicate a power adjustment value of a carrier, and therefore transmit power of the n terminals is controlled.

With reference to the first or the second possible implementation manner of the second aspect, in a fourth possible implementation manner of the second aspect, the processing module includes:

a PAPR reduction module, configured to perform, according to the PAPR reduction parameters, frequency-division PAPR reduction processing on an input signal for PAPR reduction processing, so as to obtain the output signal, where the input signal for PAPR reduction processing includes the to-be-transmitted signals.

With reference to the fourth possible implementation manner of the second aspect, in a fifth possible implementation manner of the second aspect, the PAPR reduction parameters configured by the upper-layer control module include at least frequencies $F_i$ ($i=1, 2, \ldots, n$) used by the n terminals, bandwidths $B_i$ ($i=1, 2, \ldots, n$) used by the n terminals, and parameters $C_i$ ($i=1, 2, \ldots, n$); and the PAPR reduction module is specifically configured to perform the following steps:

S1. Perform, according to a preset threshold T, peak clipping processing on the input signal for PAPR reduction processing to obtain a peak-clipped signal.

S2. Perform filtering processing on the peak-clipped signal by separately using n+1 filters $f_i$ ($i=0, 1, 2, \ldots, n$) to obtain n+1 filtered signals, where a filter $f_i$ ($i=1, 2, \ldots, n$) is generated according to a frequency $F_i$ used by an ith terminal and a bandwidth $B_i$ used by the ith terminal.

S3. Respectively multiply the n+1 filtered signals by parameters $C_i$ ($i=0, 1, 2, \ldots, n$) to obtain n+1 adjusted signals.

S4. Add the n+1 adjusted signals to the input signal for PAPR reduction processing to obtain a PAPR reduction processed signal.

S5. Use the PAPR reduction processed signal as the output signal; or use the PAPR reduction processed signal as an input signal for next-round PAPR reduction processing, repeatedly perform S1 to S4 until amplitude of the PAPR reduction processed signal is smaller than the preset threshold T or a quantity of performing times reaches a preset quantity of performing times, and then use the PAPR reduction processed signal as the output signal.

With reference to the second aspect, in a sixth possible implementation manner of the second aspect, the power control apparatus is a radio base station NodeB, an evolved NodeB (eNodeB), or a radio network controller (RNC).

According to the power control method and apparatus provided by the present disclosure, different user power is configured for and different processing is performed on different terminals, so that a balance among total power, EVM, and power amplifier efficiency in an OFDM system can be considered, and system performance of the OFDM system is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make disclosure objectives, features, and advantages of the present disclosure clearer and more comprehensible, the following describes the technical solutions in the embodiments of the present disclosure with reference to the accompanying drawings in the embodiments of the present disclosure. Apparently, the embodiments described are merely a part rather than all of the embodiments of the present disclosure. All other embodiments obtained by a person of ordinary skill in the art based on the embodiments of the present disclosure without creative efforts shall fall within the protection scope of the present disclosure.

A power control method and apparatus provided in the embodiments of the present disclosure are applicable to a communications system that uses an OFDM technology, such as an LTE communications system, and in particular, to a communications system that has a relatively high requirement for power control efficiency and precision. The power control method provided in the embodiments of the present disclosure may be implemented in a device such as a radio base station NodeB, an evolved NodeB (eNodeB), or a radio network controller (RNC), and the power control apparatus may be a device, such as a NodeB, an eNodeB, or an RNC.

Figure 1:
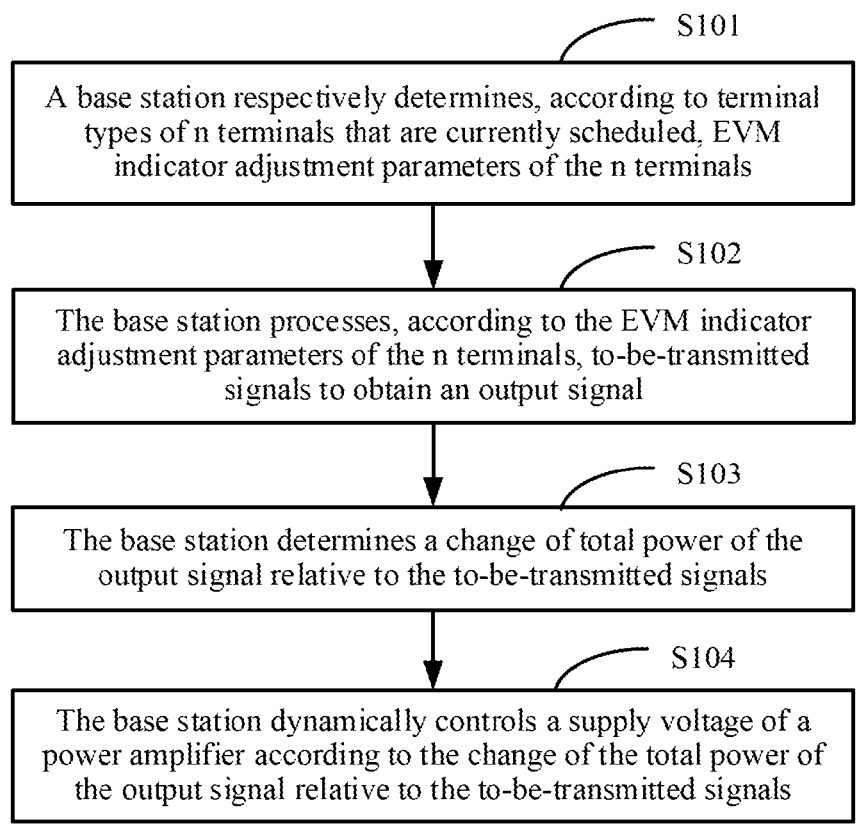
FIG. 1 is a flowchart of a power control method according to an embodiment of the present disclosure.

FIG. 1 is a flowchart of a power control method according to an embodiment. As shown in FIG. 1, the power control method of the present disclosure includes:

S101. A base station respectively determines EVM indicator adjustment parameters of n terminals according to terminal types of the n terminals that are currently scheduled, where n is a positive integer.

The terminal type includes: a near-end user, a mid-range user, or a far-end user. Specifically, the base station may determine, according to a signal to interference plus noise ratio (SINR) of a terminal, a terminal type of the terminal. Generally, the base station may obtain SINRs by converting channel quality indicators (CQI) reported by terminals, and classify the terminals into a far-end user and a near-end user. For example, a user with SINR<5 dB (Decibel) is marked as a far-end user; a user with SINR>20 dB is marked as a near-end user; and a user with 5 dB<SINR<20 dB is marked as a mid-range user.

The EVM indicator adjustment parameter includes at least one of the following: a power control parameter or a PAPR reduction parameter.

S102. The base station processes, according to the EVM indicator adjustment parameters of the n terminals, to-be-transmitted signals of the n terminals to obtain an output signal.

Case 1: The EVM Indicator Adjustment Parameter Includes the Power Control Parameter.

That a base station determines error vector magnitude EVM indicator adjustment parameters of n terminals according to terminal types of the n terminals that are currently scheduled specifically includes:

the base station adjusts the power control parameter to decrease power of a terminal whose terminal type is a near-end user; or the base station adjusts the power control parameter to increase power of a terminal whose terminal type is a mid-range user or a far-end user.

The power control parameter mainly includes a PA value and a PB value (reference may be made to a definition in 5.2 of the 3GPP Protocol 36213-b40), and generally (PA, PB)= (−3, 1). PA is a dB value of pa, where pa indicates a ratio of power of each resource element (RE) of a symbol without a pilot to power of a pilot signal; PB indicates pilot power boost information, and the PB value is a linear value and also indicates a value of $\rho b/\rho a$, where $\rho b$ separately indicates a ratio of power of an RE of a symbol with a pilot to power of a pilot signal.

If a type of a terminal that is currently scheduled is a near-end user, a power control parameter of the user is adjusted to decrease power of the user. For example, PA and PB values are adjusted from original (−3, 1) to (−4.77, 2). If a type of a terminal that is currently scheduled is a far-end user, a power control parameter of the user is adjusted to increase power of the user. For example, PA and PB values are adjusted from original (−3, 1) to (0, 0).

For example, in an LTE system, if a type of a terminal that is currently scheduled is a near-end user, a PA value of the user is lowered from original 0 to −3. In this way, total transmit power of an entire cell can be lowered. If an overall PAPR reduction parameter remains unchanged, EVM of a current user becomes smaller (that is, a difference between a signal of the current user and an ideal signal becomes smaller), which is equivalent to an increase in a signal-to-noise ratio, and therefore, a throughput of the current user is increased. If a type of a terminal that is currently scheduled is a far-end user, a PA value of the user is increased. For example, the PA value changes from original −3 to 0. If an overall PAPR reduction parameter remains unchanged, EVM of the far-end user becomes poorer, but power of the user is increased, and in addition, there is relatively high tolerance for EVM in quadrature phase shift keying (QPSK). Therefore, overall performance of the user is improved.

S102 of processing, according to the EVM indicator adjustment parameters, to-be-transmitted signals to obtain an output signal is specifically: the base station processes, according to the power control parameters, the to-be-transmitted signals to obtain the output signal.

The base station controls power of the terminal by using the power control parameter.

That the base station processes, according to the power control parameters, the to-be-transmitted signals specifically includes: the base station adjusts, according to the power control parameters, first parameter values in the to-be-transmitted signals to obtain the output signal, where the first parameter value is used to indicate a power adjustment value of a carrier, and therefore transmit power of the n terminals is controlled. For terminals at different distances, transmit power of the terminals is controlled by adjusting first parameter values in to-be-transmitted signals.

Case 2: The EVM Indicator Adjustment Parameter Includes the PAPR Reduction Parameter.

Specifically, PAPR reduction parameters may include a preset threshold T, a maximum quantity of iteration times, frequencies Fi (i=1, 2, . . . , n) used by the n terminals, bandwidths Bi (i=1, 2, . . . , n) used by the n terminals, and parameters Ci (i=1, 2, . . . , n).

S102 of processing, according to the EVM indicator adjustment parameters, to-be-transmitted signals to obtain an output signal is specifically: the base station processes, according to the PAPR reduction parameters, the to-be-transmitted signals to obtain the output signal.

Figure 2:
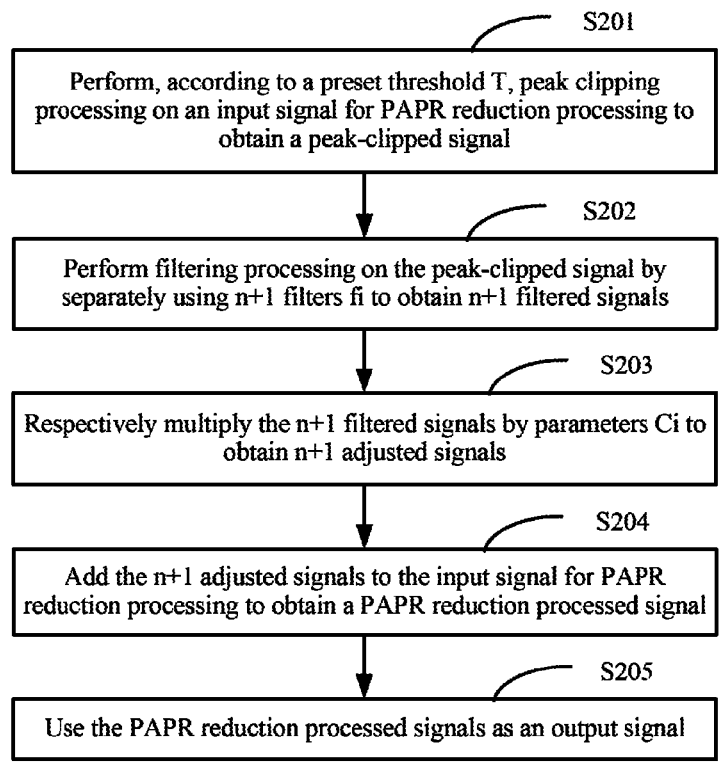
FIG. 2 is a flowchart of PAPR reduction processing according to an embodiment of the present disclosure.

That the base station processes, according to the PAPR reduction parameters, the to-be-transmitted signals to obtain the output signal is specifically: the base station uses the to-be-transmitted signals as an input signal for PAPR reduction processing; and the base station performs, according to the PAPR reduction parameters, frequency-division PAPR reduction processing on the input signal for PAPR reduction processing, so as to obtain the output signal, which is shown in FIG. 2 and specifically includes:

S201. Perform, according to a preset threshold T, peak clipping processing on the input signal for PAPR reduction processing to obtain a peak-clipped signal.

Specifically, a location that is in an input signal S and at which amplitude exceeds the preset threshold T is first found, and then peak clipping is performed on the found location to obtain a peak-clipped signal S'.

S202. Perform filtering processing on the peak-clipped signal by separately using n+1 filters fi (i=0, 1, 2, . . . , n) to obtain n+1 filtered signals, where a filter fi (i=1, 2, . . . , n) is generated according to a frequency Fi used by an $i^{th}$ terminal and a bandwidth Bi used by the $i^{th}$ terminal, where S202 specifically includes:

S2021. Perform filtering processing on the peak-clipped signal S' by using a filter f0.

S2022. Multiply, by a parameter C0, a signal obtained after filtering by using the filter 10.

S2023. Generate n filters fi (i=1, 2, . . . , n) according to frequency Fi information and bandwidth Bi information indicated by an upper layer.

S2024. Perform filtering processing on the peak-clipped signal S' by using the n filters fi (i=1, 2, . . . , n), so as to obtain filtered signals.

S203. Respectively multiply the n+1 filtered signals by parameters Ci (i=0, 1, 2, . . . , n) to obtain n+1 adjusted signals.

S204. Add the n+1 adjusted signals to the input signal for PAPR reduction processing to obtain a PAPR reduction processed signal.

The to-be-transmitted signal S and the signals obtained in step S201 to step S203 are added together.

S205. Use the PAPR reduction processed signal as the output signal.

The signal obtained in S204 is used as the output signal; or the PAPR reduction processed signal is used as an input signal for next-round PAPR reduction processing. S201 to S204 are repeatedly performed until amplitude of the signal is smaller than the preset threshold T or a quantity of iteration times reaches a maximum quantity of iteration times, and then the PAPR reduction processed signal is used as the output signal.

In a process of PAPR reduction processing, EVM degradation may be introduced. A higher threshold T in the PAPR reduction parameter causes smaller EVM, a lower threshold T in the PAPR reduction parameter causes larger EVM, and smaller EVM provides better performance. In the prior art, same PAPR reduction processing is performed on terminals without differentiating a near-end user and a far-end user. Therefore, during PAPR reduction processing, EVM is generally introduced, which causes deterioration of overall system performance. Different EVM may be tolerated in different modulation schemes, and a higher-order modulation scheme means lower tolerance. For example, indicators of modulation schemes QPSK, 16 quadrature amplitude modulation (16QAM), and 64 quadrature amplitude modulation (64QAM) provided in standard 3GPPTS36104-b40 are respectively 17.5%, 12.5%, and 8%. In this embodiment of the present disclosure, for terminals at different distances, different modulation schemes are used, and different PAPR reduction processing may be performed. In this way, by means of frequency-division PAPR reduction processing, a balance between EVM and power amplifier efficiency in an OFDM system can be effectively considered, and system performance of the OFDM system is improved.

For example, in an LTE system, a current bandwidth is 20 M, the current bandwidth is allocated to two users, one of which is a far-end user (which uses QPSK modulation), and the other of which is a near-end user (which uses 64QAM modulation). The two users respectively occupy a first and a second half of the bandwidth (each half of the bandwidth is 10 M). Assuming that a power control parameter configured by an upper layer remains unchanged, and a threshold T for PAPR reduction also remains unchanged, processing performed in subsequent superposed noise processing is as follows: Assuming that C0 is 1, noise at a frequency band of the far-end user is increased (for example, C1 is set to 0.5), and noise at a frequency band of the near-end user is decreased (for example, C2 is set to −0.5). In this way, EVM of the near-end user is smaller than EVM of the near-end user without the foregoing processing, and EVM of the far-end user is larger than EVM of the far-end user without the foregoing processing. Therefore, performance of the near-end user is improved, and because there is relatively high tolerance for EVM in QPSK, performance of the far-end user may not necessarily deteriorate.

It should be noted that, in this embodiment of the present disclosure, the to-be-transmitted signal may be processed by using only the method in case 1, and user power configuration is performed to control total transmit power of an entire cell and improve the system performance of the OFDM system. The to-be-transmitted signal may also be processed by using only the method in case 2. That is, if a power control parameter of a current terminal remains unchanged, different adjustment to EVM indicator parameters may be performed according to terminal types, and therefore PAPR reduction processing is performed to perform different processing on terminals at different distances, thereby improving power amplifier efficiency and meeting different demands. In addition, the to-be-transmitted signal may be processed in a manner of combining the methods in the two cases. For example, if a power control parameter of a current terminal is increased, a PAPR reduction parameter (Ci) may be adjusted so that more noise may be added to a signal of the terminal; if the power control parameter of the current terminal is decreased, noise may be reduced.

In this way, according to the power control method provided by the present disclosure, different processing may be performed on signals of different terminals, so that a balance among total power, EVM, and power amplifier efficiency in an OFDM system is considered, and the system performance of the OFDM system is improved.

For example, in an LTE system, a current bandwidth is 20 M, the current bandwidth is allocated to two users, one of which is a far-end user that uses QPSK modulation, and the other of which is a near-end user that uses 64QAM modulation. The two users respectively occupy a first and a second half of the bandwidth (each half of the bandwidth is 10 M). It is assumed that a power control parameter of the far-end user is increased by an upper layer. For example, a PA value of the user is increased, and for example, the PA value is changed from original −1 to 1. In addition, it is assumed that a threshold T for PAPR reduction remains unchanged. Processing performed in subsequent PAPR reduction processing is as follows: Assuming that C0 is 1, noise at a frequency band of the far-end user is increased, for example, C1 is set to 0.5; noise at a frequency band of the near-end user is decreased, for example, C2 is set to −0.5. In this way, EVM of the near-end user is smaller than EVM of the near-end user without the foregoing processing, and EVM of the far-end user is larger than EVM of the far-end user without the foregoing processing. Therefore, performance of the near-end user is improved, and because there is relatively high tolerance for EVM in QPSK, performance of the far-end user may not necessarily deteriorate.

Continue to refer to FIG. 1: S103. The base station determines a change of total power of the output signal relative to the to-be-transmitted signals.

The base station determines the change of the total power of the final output signal relative to the to-be-transmitted signals according to a processing result in the method in S101 and S102 (which may include: processing according only to case 1, or processing according only to case 2, or processing in a manner of combining the two cases).

S104. The base station dynamically controls a supply voltage of a power amplifier according to the change of the total power of the output signal relative to the to-be-transmitted signals.

If the total power of the output signal relative to the to-be-transmitted signals becomes higher, the supply voltage of the power amplifier is increased, and if the total power of the output signal relative to the to-be-transmitted signals becomes lower, the supply voltage of the power amplifier is decreased.

For example, in an LTE system, it is assumed that an upper layer decreases power control parameters of all (or some) current terminals, that is, power output by a power amplifier becomes lower. In this case, a supply voltage of the power amplifier is decreased. On the contrary, if the upper layer increases the power of all (or some) of the current users, the supply voltage of the power amplifier is increased. In this way, the supply voltage of the power amplifier matches actual output power.

According to the power control method provided in this embodiment of the present disclosure, power of different terminals is controlled by using power control parameters. Different PAPR reduction processing is used for terminals at different distances, so that different terminals may have different scheduling policies; in addition, a balance among total power, EVM, and power amplifier efficiency in an OFDM system is considered, and overall performance of the OFDM system is improved.

Figure 3:
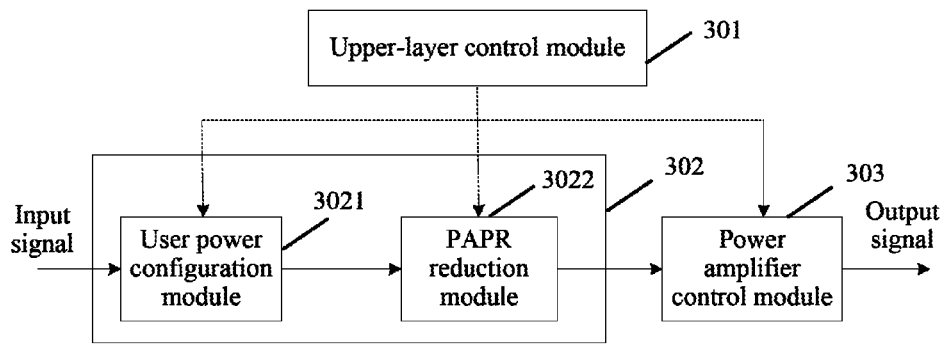
FIG. 3 is a schematic structural diagram of a power control apparatus according to an embodiment of the present disclosure.

FIG. 3 is a schematic diagram of a power control apparatus according to an embodiment. As shown in FIG. 3, the power control apparatus of the present disclosure includes: an upper-layer control module 301, a processing module 302, and a power amplifier control module 303.

The upper-layer control module 301 is configured to respectively determine EVM indicator adjustment parameters of n terminals according to terminal types of the n terminals that are currently scheduled, where n is a positive integer.

The terminal type includes: a near-end user, a mid-range user, or a far-end user. Specifically, a base station may determine, according to an SINR of a terminal, a terminal type of the terminal. Generally, the base station may obtain SINRs by converting CQIs reported by terminals, and classify the terminals into a far-end user and a near-end user. For example, a user with SINR<5 dB (Decibel) is marked as a far-end user; a user with SINR>20 dB is marked as a near-end user; and a user with 5 dB<SINR<20 dB is marked as a mid-range user.

The EVM indicator adjustment parameter configured by the upper-layer control module 301 includes at least one of the following: a power control parameter or a PAPR reduction parameter.

Case 1: The EVM Indicator Adjustment Parameter Configured by the Upper-Layer Control Module 301 Includes the Power Control Parameter.

The upper-layer control module 301 is specifically configured to adjust the power control parameter to decrease power of a terminal whose terminal type is a near-end user. Alternatively, the upper-layer control module 301 is specifically configured to adjust the power control parameter to increase power of a terminal whose terminal type is a mid-range user or a far-end user. The base station controls the power of the terminal by using the power control parameter.

The power control parameter includes a PA value and a PB value, and generally (PA, PB)=(−3, 1). If a type of a terminal that is currently scheduled is a near-end user, the upper-layer control module 301 adjusts a power control parameter of the user to decrease power of the user. For example, PA and PB values are adjusted from original (−3, 1) to (−4.77, 2). If a type of a terminal that is currently scheduled is a far-end user, the upper-layer control module 301 adjusts a power control parameter of the user to increase power of the user. For example, PA and PB values are adjusted from original (−3, 1) to (0, 0).

Case 2: The EVM Indicator Adjustment Parameter Configured by the Upper-Layer Control Module 301 Includes the PAPR Reduction Parameter.

PAPR reduction parameters configured by the upper-layer control module 301 may include a preset threshold T, a maximum quantity of iteration times, frequencies $F_i$ (i=1, 2, ..., n) used by the n terminals, bandwidths $B_i$ (i=1, 2, ..., n) used by the n terminals, and parameters $C_i$ (i=1, 2, ..., n).

The processing module 302 is configured to process, according to the EVM indicator adjustment parameters configured by the upper-layer control module 301, to-be-transmitted signals to obtain an output signal.

The processing module 302 includes a user power configuration module 3021 and/or a PAPR reduction module 3022.

The user power configuration module 3021 is configured to adjust, according to the power control parameters, first parameter values in the to-be-transmitted signals to obtain the output signal, where the first parameter value is used to indicate a power adjustment value of a carrier, and therefore transmit power of the n terminals is controlled.

The PAPR reduction module 3022 is configured to perform, according to the PAPR reduction parameters, frequency-division PAPR reduction processing on an input signal for PAPR reduction processing, so as to obtain the output signal, where the input signal for PAPR reduction processing includes the to-be-transmitted signals or signals output by the user power configuration module 3021.

Figure 4:
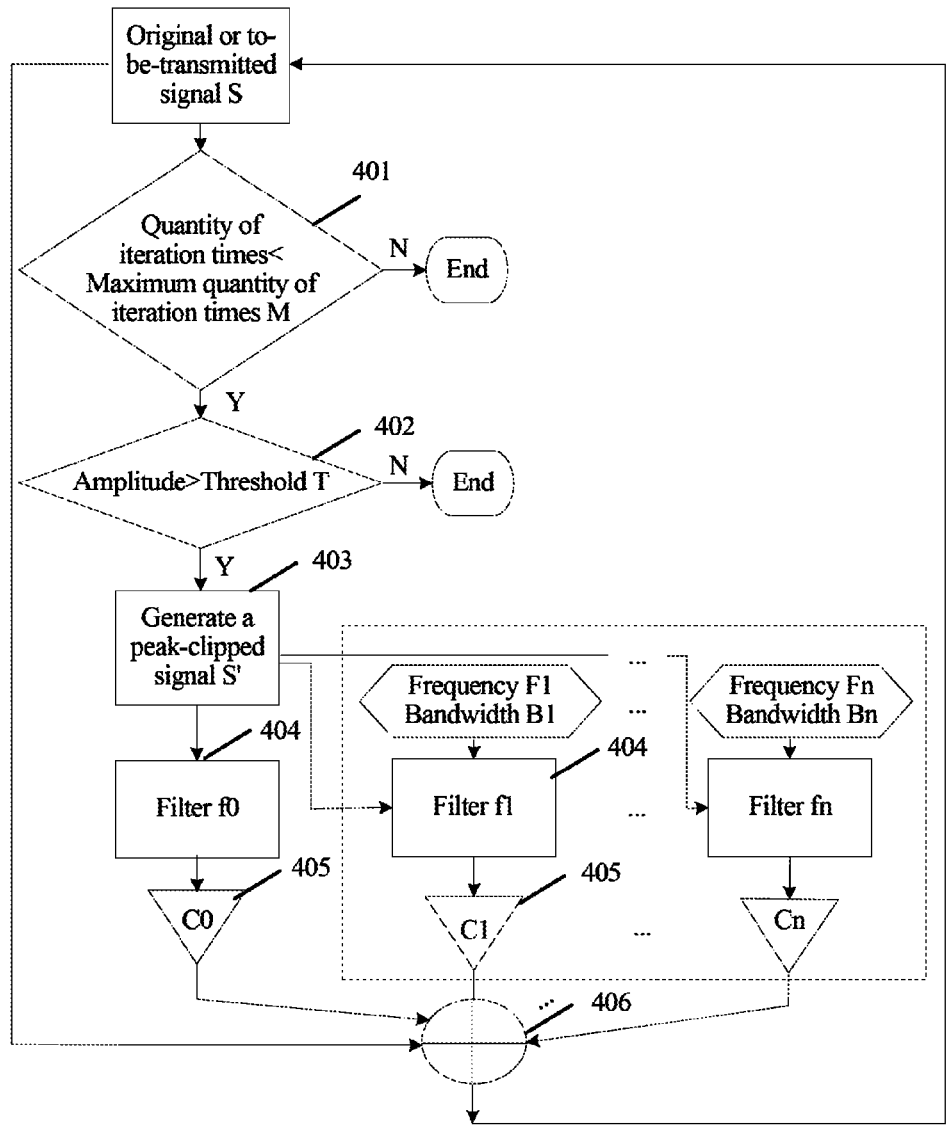
FIG. 4 is a schematic diagram of a PAPR reduction module according to an embodiment of the present disclosure.

As shown in FIG. 4, the PAPR reduction module 3022 specifically includes: a first determining unit 401, a second determining unit 402, a peak clipping unit 403, multiple filters 404, multiple multipliers 405, and an adder 406, which are specifically configured to perform the steps shown in FIG. 2.

The first determining unit 401 is configured to determine whether a quantity of iteration times is smaller than a maximum quantity of iteration times M, where if the quantity of iteration times is smaller than the maximum quantity of iteration times M, the procedure passes to the second determining unit 402, or if the quantity of iteration times is not smaller than the maximum quantity of iteration times M, the procedure ends.

The second determining unit 402 is configured to determine whether amplitude of a to-be-transmitted signal S exceeds the preset threshold T, where if the amplitude of the to-be-transmitted signal S exceeds the preset threshold T, the procedure passes to the peak clipping unit 403, and a peak-clipped signal S' is generated; and if the amplitude of the to-be-transmitted signal S does not exceed the preset threshold T, the procedure ends.

The peak-clipped signal S' generated by the peak clipping unit 403 separately enters the multiple filters 404 and the multiple multipliers 405. Finally, signals obtained by all the multipliers 405 are added together by using the adder 406. Go back to the first determining unit 401 to perform repeated iterations. The filters fi (i=1, 2, . . . , n) separately have different frequencies Fi and bandwidths Bi.

Specifically, steps performed by the PAPR reduction module 3022 may be shown in FIG. 2.

The power amplifier control module 303 is configured to: determine a change of total power of the output signal obtained by processing the to-be-transmitted signals by using the processing module 302, and dynamically control a supply voltage of a power amplifier according to the change of the total power of the output signal.

If the total power of the output signal becomes higher, the power amplifier control module 303 increases the supply voltage of the power amplifier. If the total power of the output signal becomes lower, the power amplifier control module 303 decreases the supply voltage of the power amplifier.

According to the power control method and apparatus provided by the present disclosure, power of different terminals is controlled by using power control parameters. Different PAPR reduction processing is used for terminals at different distances, so that different terminals may have different scheduling policies; in addition, a balance among total power, EVM, and power amplifier efficiency in an OFDM system is considered, and overall performance of the OFDM system is improved.

Figure 5:
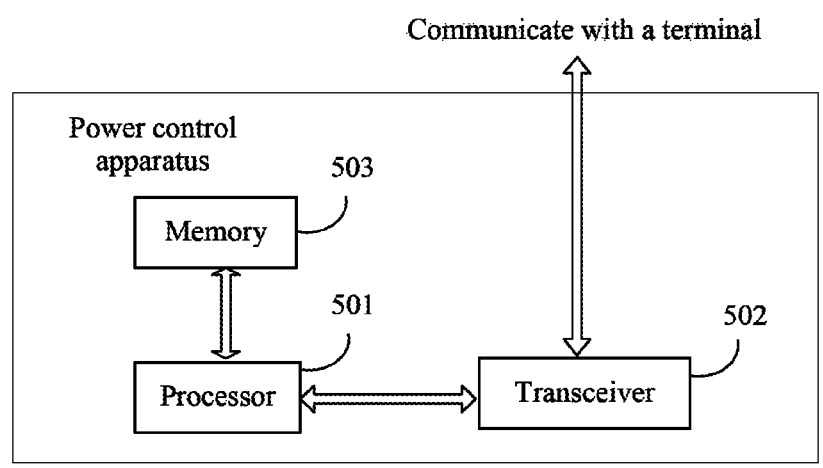
FIG. 5 is a schematic diagram of a composition structure of a power control apparatus according to an embodiment of the present disclosure.

FIG. 5 is a schematic diagram of a composition structure of a power control apparatus according to an embodiment of the present disclosure. As shown in FIG. 5, the power control apparatus includes: a processor 501, a transceiver 502, and a memory 503.

The processor 501 may be a single-core or multi-core central processing unit (CPU), or an application-specific integrated circuit (ASIC), or be configured as one or more integrated circuits for implementing embodiments of the present disclosure.

The transceiver 502 is configured to interact with user equipment.

The memory 503 is configured to store a program.

The processor 501 invokes the program stored by the memory 503 to perform:

respectively determining error vector magnitude EVM indicator adjustment parameters of n terminals according to terminal types of the n terminals that are currently scheduled, where n is a positive integer, the EVM indicator adjustment parameter includes at least one of the following: a power control parameter or a peak to average power ratio PAPR reduction parameter, and the terminal type includes: a near-end user, a mid-range user, or a far-end user;

processing, according to the EVM indicator adjustment parameters of the n terminals, to-be-transmitted signals of the n terminals to obtain an output signal, and determining a change of total power of the output signal relative to the to-be-transmitted signals; and dynamically controlling a supply voltage of a power amplifier according to the change of the total power of the output signal relative to the to-be-transmitted signals.

Further, the processor 501 is specifically configured to: if the total power of the output signal relative to the to-be-transmitted signals becomes higher, increase the supply voltage of the power amplifier; or if the total power of the output signal relative to the to-be-transmitted signals becomes lower, decrease the supply voltage of the power amplifier.

Further, the processor 501 is specifically configured to: adjust the power control parameter to reduce power of a terminal whose terminal type is a near-end user; or adjust the power control parameter to increase power of a terminal whose terminal type is a mid-range user or a far-end user.

Further, the processor 501 is specifically configured to adjust, according to the power control parameters, first parameter values in the to-be-transmitted signals to obtain the output signal, where the first parameter value is used to indicate a power adjustment value of a carrier, and therefore transmit power of the n terminals is controlled.

Further, the processor 501 is specifically configured to: use the to-be-transmitted signals as an input signal for PAPR reduction processing; and perform, according to the PAPR reduction parameters, frequency-division PAPR reduction processing on the input signal for PAPR reduction processing, so as to obtain the output signal.

Further, the PAPR reduction parameters include at least frequencies Fi (i=1, 2, . . . , n) used by the n terminals, bandwidths Bi (i=1, 2, . . . , n) used by the n terminals, and parameters Ci (i=1, 2, . . . , n).

Specifically, the power control apparatus further performs, according to the instruction, the power control method shown in FIG. 1 and FIG. 2, and details are not described herein again.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A power control method, wherein the method comprises:
   respectively determining, by a base station, according to terminal types of n terminals that are currently scheduled, error vector magnitude (EVM) indicator adjustment parameters of the n terminals, wherein n is a positive integer;
   processing, by the base station according to the EVM indicator adjustment parameters of the n terminals, to-be-transmitted signals of the n terminals to obtain an output signal;
   determining a change of a total power of the output signal relative to a total power of the to-be-transmitted signals of the n terminals; and
   dynamically controlling, by the base station, a supply voltage of a power amplifier according to the change of the total power of the output signal relative to the total power of the to-be-transmitted signals of the n terminals, wherein
   the EVM indicator adjustment parameters of the n terminals comprise power control parameters of the n terminals, and
   the processing, by the base station according to the EVM indicator adjustment parameters of the n terminals, the to-be-transmitted signals of the n terminals to obtain the output signal comprises:
      adjusting, by the base station according to the power control parameters of the n terminals, first parameter values in the to-be-transmitted signals of the n terminals to obtain the output signal, wherein each one of the first parameter values is used to indicate a power adjustment value of a carrier signal, and the adjustment of the first parameter values controls transmit powers of the n terminals.

2. The method according to claim 1, wherein the dynamically controlling, by the base station, the supply voltage of the power amplifier according to the change of the total power of the output signal relative to the total power of the to-be-transmitted signals of the n terminals comprises at least one of:
   when the total power of the output signal relative to the total power of the to-be-transmitted signals of the n terminals becomes higher, increasing the supply voltage of the power amplifier; and
   when the total power of the output signal relative to the total power of the to-be-transmitted signals of the n terminals becomes lower, decreasing the supply voltage of the power amplifier.

3. A power control apparatus comprising a processor, a transceiver, and a memory, wherein the memory is configured to store instructions for power control, and the processor is configured to execute the instructions to:
   respectively determine, according to terminal types of n terminals that are currently scheduled, error vector magnitude (EVM) indicator adjustment parameters of the n terminals, wherein n is a positive integer;
   process, according to the EVM indicator adjustment parameters of the n terminals, to-be-transmitted signals of the n terminals to obtain an output signal;
   determine a change of a total power of the output signal relative to a total power of the to-be-transmitted signals of the n terminals; and
   dynamically control a supply voltage of a power amplifier according to the change of the total power of the output signal relative to the total power of the to-be-transmitted signals of the n terminals, wherein
   the EVM indicator adjustment parameters of the n terminals comprise power control parameters of the n terminals, and
   the processor is configured to:
      adjust according to the power control parameters of the n terminals, first parameter values in the to-be-transmitted signals of the n terminals to obtain the output signal, wherein each one of the first parameter values is used to indicate a power adjustment value of a carrier, and the adjustment of the first parameter values controls transmit powers of the n terminals.

4. The apparatus according to claim 3, wherein the processor is configured to perform at least one of:
   when the total power of the output signal relative to the total power of the to-be-transmitted signals of the n terminals becomes higher, increasing the supply voltage of the power amplifier; and
   when the total power of the output signal relative to the total power of the to-be-transmitted signals of the n terminals becomes lower, decreasing the supply voltage of the power amplifier.

5. The apparatus according to claim 3, wherein the power control apparatus is a radio base station NodeB, an evolved NodeB (eNodeB), or a radio network controller (RNC).

6. A power control method, wherein the method comprises:
   respectively determining, by a control circuit, according to terminal types of n terminals that are currently scheduled, error vector magnitude (EVM) indicator adjustment parameters of the n terminals, wherein n is a positive integer;
   processing, by the control circuit according to the EVM indicator adjustment parameters of the n terminals, to-be-transmitted signals of the n terminals to obtain an output signal;
   determining a change of a total power of the output signal relative to a total power of the to-be-transmitted signals of the n terminals; and
   dynamically controlling, by the control circuit, a supply voltage of a power amplifier according to the change of the total power of the output signal relative to the total power of the to-be-transmitted signals of the n terminals, wherein the EVM indicator adjustment parameters of the n terminals comprise power control parameters of the n terminals, and the processing, by the control circuit according to the EVM indicator adjustment parameters of the n terminals, the to-be-transmitted signals of the n terminals to obtain the output signal comprises:

adjusting, by the control circuit according to the power control parameters of the n terminals, first parameter values in the to-be-transmitted signals of the n terminals to obtain the output signal, wherein each one of the first parameter values is used to indicate a power adjustment value of a carrier signal, and the adjustment of the first parameter values controls transmit powers of the n terminals.

7. The method according to claim 6, wherein the dynamically controlling, by the control circuit, the supply voltage of the power amplifier according to the change of the total power of the output signal relative to the total power of the to-be-transmitted signals of the n terminals comprises at least one of:

when the total power of the output signal relative to the total power of the to-be-transmitted signals of the n terminals becomes higher, increasing the supply voltage of the power amplifier; and when the total power of the output signal relative to the total power of the to-be-transmitted signals of the n terminals becomes lower, decreasing the supply voltage of the power amplifier.

8. A power control method, wherein the method comprises:

respectively determining, by a base station, according to terminal types of n terminals that are currently scheduled, error vector magnitude (EVM) indicator adjustment parameters of the n terminals, wherein n is a positive integer;

processing, by the base station according to the EVM indicator adjustment parameters of the n terminals, to-be-transmitted signals of the n terminals to obtain an output signal;

determining a change of a total power of the output signal relative to a total power of the to-be-transmitted signals of the n terminals; and dynamically controlling, by the base station, a supply voltage of a power amplifier according to the change of the total power of the output signal relative to the total power of the to-be-transmitted signals of the n terminals, wherein the EVM indicator adjustment parameters of the n terminals comprise peak to average power ratio (PAPR) reduction parameters of the n terminals, and the processing, by the base station according to the EVM indicator adjustment parameters of the n terminals, the to-be-transmitted signals of the n terminals to obtain the output signal comprises:

performing, by the base station according to the PAPR reduction parameters, frequency-division PAPR reduction processing on an input signal for PAPR reduction processing, so as to obtain the output signal, wherein the input signal for PAPR reduction processing includes the to-be-transmitted signals of the n terminals.

9. The method according to claim 8, wherein the PAPR reduction parameters comprise at least frequencies $F_i$ (i=1, 2, . . . , n) used by the n terminals, bandwidths $B_i$ (i=1, 2, . . . , n) used by the n terminals, and parameters $C_i$ (i=1, 2, . . . , n), and the performing, by the base station according to the PAPR reduction parameters, frequency-division PAPR reduction processing on the input signal for PAPR reduction processing, so as to obtain the output signal comprises:

S1. peak-clipping, according to a preset threshold T, the input signal for PAPR reduction processing to obtain a peak-clipped signal;

S2. filtering peak-clipped signal by separately using n+1 filters $f_i$ (i=0, 1, 2, . . . , n) to obtain n+1 filtered signals, wherein a filter $f_i$ (i=1, 2, . . . , n) is generated according to a frequency $F_i$ used by an ith terminal and a bandwidth $B_i$ used by the ith terminal;

S3. multiplying respectively the n+1 filtered signals by parameters $C_i$ (i=0, 1, 2, . . . , n) to obtain n+1 adjusted signals;

S4. adding the n+1 adjusted signals to the input signal for PAPR reduction processing to obtain a PAPR reduction processed signal; and S5. using the PAPR reduction processed signal as the output signal or using the PAPR reduction processed signal as an input signal for a next-round PAPR reduction processing that repeatedly performs S1 to S4 until an amplitude of the PAPR reduction processed signal is smaller than the preset threshold T or a quantity of performing times reaches a preset quantity of performing times.

10. The method according to claim 8, wherein the dynamically controlling, by the base station, the supply voltage of the power amplifier according to the change of the total power of the output signal relative to the total power of the to-be-transmitted signals of the n terminals comprises at least one of:

when the total power of the output signal relative to the total power of the to-be-transmitted signals of the n terminals becomes higher, increasing the supply voltage of the power amplifier; and when the total power of the output signal relative to the total power of the to-be-transmitted signals of then terminals becomes lower, decreasing the supply voltage of the power amplifier.

11. A power control apparatus comprising a processor, a transceiver, and a memory, wherein the memory is configured to store instructions for power control, and the processor is configured to execute the instructions to:

respectively determine, according to terminal types of n terminals that are currently scheduled, error vector magnitude (EVM) indicator adjustment parameters of the n terminals, wherein n is a positive integer;

process, according to the EVM indicator adjustment parameters of the n terminals, to-be-transmitted signals of the n terminals to obtain an output signal;

determine a change of a total power of the output signal relative to a total power of the to-be-transmitted signals of the n terminals; and dynamically control a supply voltage of a power amplifier according to the change of the total power of the output signal relative to the total power of the to-be-transmitted signals of the n terminals, wherein the EVM indicator adjustment parameters of the n terminals comprise peak to average power ratio (PAPR) reduction parameters of the n terminals, and the processor is configured to:
perform, according to the PAPR reduction parameters, frequency-division PAPR reduction processing on an input signal for PAPR reduction processing, so as to obtain the output signal, wherein the input signal for PAPR reduction processing includes the to-be-transmitted signals of the n terminals.

12. The apparatus according to claim 11, wherein
the PAPR reduction parameters comprise at least frequencies Fi (i=1, 2, . . . , n) used by then terminals, bandwidths Bi (i=1, 2, . . . , n) used by then terminals, and parameters Ci (=1, 2, . . . , n), and
the processor is specifically configured to:
S1. peak clip, according to a preset threshold T, the input signal for PAPR reduction processing to obtain a peak-clipped signal;
S2. filter the peak-clipped signal by separately using n+1 filters fi (i=0, . . . , n) to obtain n+1 filtered signals, wherein a filter fi (i=1, 2, . . . , n) is generated according to a frequency Fi used by an ith terminal and a bandwidth Bi used by the ith terminal;
S3. respectively multiply the n+1 filtered signals by parameters Ci (i=0, 1, 2, . . . , n) to obtain n+1 adjusted signals;
S4. add the n+1 adjusted signals to the input signal for PAPR reduction processing to obtain a PAPR reduction processed signal; and
S5. use the PAPR reduction processed signal as the output signal; or use the PAPR reduction processed signal as an input signal for a next-round PAPR reduction processing that, repeatedly performs S1 to S4 until an amplitude of the PAPR reduction processed signal is smaller than the preset threshold T or a quantity of performing times reaches a preset quantity of performing times.

13. The apparatus according to claim 11, wherein the processor is configured to perform at least one of:
when the total power of the output signal relative to the total power of the to-be-transmitted signals of then terminals becomes higher, increasing the supply voltage of the power amplifier; and
when the total power of the output signal relative to the total power of the to-be-transmitted signals of the n terminals becomes lower, decreasing the supply voltage of the power amplifier.

14. The apparatus according to claim 11, wherein the power control apparatus is a radio base station NodeB, an evolved NodeB (eNodeB), or a radio network controller (RNC).

15. A power control method, wherein the method comprises:
respectively determining, by a control circuit, according to terminal types of n terminals that are currently scheduled, error vector magnitude (EVM) indicator adjustment parameters of the n terminals, wherein n is a positive integer;
processing, by the control circuit according to the EVM indicator adjustment parameters of the n terminals, to-be-transmitted signals of the n terminals to obtain an output signal;
determining a change of a total power of the output signal relative to a total power of the to-be-transmitted signals of the n terminals; and
dynamically controlling, by the control circuit, a supply voltage of a power amplifier according to the change of the total power of the output signal relative to the total power of the to-be-transmitted signals of the n terminals, wherein
the EVM indicator adjustment parameters of the n terminals comprise peak to average power ratio (PAPR) reduction parameters of the n terminals, and
the processing, by the control circuit according to the EVM indicator adjustment parameters of the n terminals, the to-be-transmitted signals of the n terminals to obtain the output signal comprises:
performing, by the control circuit according to the PAPR reduction parameters, frequency-division PAPR reduction processing on an input signal for PAPR reduction processing, so as to obtain the output signal, wherein the input signal for PAPR reduction processing includes the to-be-transmitted signals of the n terminals.

16. The method according to claim 15, wherein
the PAPR reduction parameters comprise at least frequencies Fi (i=1, 2, . . . , n) used by the n terminals, bandwidths Bi (i=1, 2, . . . , n) used by the n terminals, and parameters Ci (i=1, 2, . . . , n), and
the performing, by the control circuit according to the PAPR reduction parameters, frequency-division PAPR reduction processing on the input signal for PAPR reduction processing, so as to obtain the output signal comprises:
S1. peak-clipping, according to a preset threshold T, the input signal for PAPR reduction processing to obtain a peak-clipped signal;
S2. filtering peak-clipped signal by separately using n+1 filters fi (i=0, 1, 2, . . . , n) to obtain n+1 filtered signals, wherein a filter fi (i=1, 2, . . . , n) is generated according to a frequency Fi used by an ith terminal and a bandwidth Bi used by the ith terminal;
S3. multiplying respectively the n+1 filtered signals by parameters Ci (i=0, 1, 2, . . . , n) to obtain n+1 adjusted signals;
S4. adding the n+1 adjusted signals to the input signal for PAPR reduction processing to obtain a PAPR reduction processed signal; and
S5. using the PAPR reduction processed signal as the output signal or using the PAPR reduction processed signal as an input signal for a next-round PAPR reduction processing that repeatedly performs S1 to S4 until an amplitude of the PAPR reduction processed signal is smaller than the preset threshold T or a quantity of performing times reaches a preset quantity of performing times.

17. The method according to claim 15, wherein the dynamically controlling, by the control circuit, the supply voltage of the power amplifier according to the change of the total power of the output signal relative to the total power of the to-be-transmitted signals of the n terminals comprises at least one of:
when the total power of the output signal relative to the total power of the to-be-transmitted signals of the n terminals becomes higher, increasing the supply voltage of the power amplifier; and
when the total power of the output signal relative to the total power of the to-be-transmitted signals of the n terminals becomes lower, decreasing the supply voltage of the power amplifier.

* * * * *

UNITED STATES PATENT AND TRADEMARK OFFICE
CERTIFICATE OF CORRECTION

PATENT NO. : 9,961,652 B2  
APPLICATION NO. : 15/264163  
DATED : May 1, 2018  
INVENTOR(S) : Zhiqiang Zou et al.

Page 1 of 1

It is certified that error appears in the above-identified patent and that said Letters Patent is hereby corrected as shown below:

In the Claims

In Column 16, Line 44, Claim 10, "then" should read -- the n --.
In Column 17, Line 10, Claim 12, "then" should read -- the n --.
In Column 17, Line 11, Claim 12, "then" should read -- the n --.
In Column 17, Line 12, Claim 12, "Ci (=1, 2, . . . , n)," should read -- Ci (i=1, 2, . . . , n), --.
In Column 17, Line 18, Claim 12, "fi (i=0, . . . , n)" should read -- fi (i=0, 1, 2, . . . , n) --.
In Column 17, Line 39, Claim 13, "then" should read -- the n --.

Signed and Sealed this  
Twenty-eighth Day of April, 2020

Andrei Iancu  
*Director of the United States Patent and Trademark Office*